(12) United States Patent
Huang et al.

(10) Patent No.: US 11,728,079 B2
(45) Date of Patent: Aug. 15, 2023

(54) ELECTRIC PERMANENT MAGNET CHUCK

(71) Applicant: HVR MAGNETICS CO., LTD, Hunan (CN)

(72) Inventors: Daqi Huang, Zhuzhou (CN); Bin Huang, Zhuzhou (CN); Zhengsheng Ren, Zhuzhou (CN)

(73) Assignee: HVR MAGNETICS CO., LTD, Hunan (CN)

( * ) Notice: Subject to any disclaimer, the term of this patent is extended or adjusted under 35 U.S.C. 154(b) by 617 days.

(21) Appl. No.: 16/636,067

(22) PCT Filed: Jul. 26, 2018

(86) PCT No.: PCT/CN2018/097140
§ 371 (c)(1),
(2) Date: Feb. 3, 2020

(87) PCT Pub. No.: WO2019/024748
PCT Pub. Date: Feb. 7, 2019

(65) Prior Publication Data
US 2020/0156195 A1    May 21, 2020

(30) Foreign Application Priority Data

Aug. 4, 2017  (CN) .......................... 201710660909.3
Aug. 8, 2017  (CN) .......................... 201710670602.1
Sep. 1, 2017  (CN) .......................... 201721120371.9

(51) Int. Cl.
*H01F 7/02*    (2006.01)
*B23Q 3/154*   (2006.01)

(52) U.S. Cl.
CPC ......... *H01F 7/0257* (2013.01); *B23Q 3/1546* (2013.01); *H01F 7/0221* (2013.01)

(58) Field of Classification Search
CPC ................ H01F 7/0257; H01F 7/0221; H01F 2007/208; H01F 7/206; B23Q 3/1546; B23Q 3/154; B25B 11/002
See application file for complete search history.

(56) References Cited

U.S. PATENT DOCUMENTS 1,081,462 A * 12/1913 Patton .................. B23Q 3/1543
                                                          335/289
4,847,582 A    7/1989 Cardone
(Continued)

FOREIGN PATENT DOCUMENTS

CN    201092045 Y    7/2008
CN    101524817 A    9/2009
(Continued)

OTHER PUBLICATIONS

Supplementary European Search Report in the European application No. 18841362.9, dated Apr. 12, 2021, 7 pgs.
(Continued)

*Primary Examiner* — Mohamad A Musleh
(74) *Attorney, Agent, or Firm* — Cooper Legal Group, LLC (57) ABSTRACT

An electric permanent magnet chuck, comprising a casing (1), the casing being provided thereon with at least one open inner cavity; reversible magnetic material (2) is provided at a lower portion of the inner cavity, and a coil (3) is arranged in the inner cavity along an outer wall of the reversible magnetic material; a magnetic pole (4) is superposed and fixed in the inner cavity, an annular groove being provided at a lower surface of the magnetic pole, and permanent magnetic material (5) that matches the annular groove being disposed in the annular groove. The electric permanent
(Continued)

magnet chuck has the advantages of a simple structure, low processing difficulty, good sealing performance, small magnetic loss and so on.

15 Claims, 9 Drawing Sheets

(56) References Cited

U.S. PATENT DOCUMENTS

| | | |
|---|---|---|
| 2008/0290973 A1 | 11/2008 | Sarda |
| 2010/0301532 A1 | 12/2010 | Cardone |
| 2011/0037547 A1 | 2/2011 | Cardone |
| 2011/0043310 A1* | 2/2011 | Cardone ............... B25B 11/002 335/289 |
| 2012/0267837 A1* | 10/2012 | Cardone ............... B25B 11/002 269/8 |
| 2015/0279536 A1 | 10/2015 | Ding |

FOREIGN PATENT DOCUMENTS

| | | |
|---|---|---|
| CN | 101821053 A | 9/2010 |
| CN | 203095379 U | 7/2013 |
| CN | 203579285 U | 5/2014 |
| CN | 203579286 U | 5/2014 |
| CN | 104015082 A | 9/2014 |
| CN | 204844669 U | 12/2015 |
| CN | 206084536 U | 4/2017 |
| CN | 206331866 U | 7/2017 |
| CN | 107263183 A | 10/2017 |
| CN | 107393678 A | 11/2017 |
| CN | 206991866 U | 2/2018 |
| CN | 207104454 U | 3/2018 |
| CN | 207171590 U | 4/2018 |
| DE | 3201826 A1 * | 9/1983 |
| EP | 1057583 A1 | 12/2000 |
| GB | 758183 A | 10/1956 |
| JP | S59084807 U | 6/1984 |
| JP | H10208930 A | 8/1998 |
| JP | H1190301 A | 4/1999 |
| JP | 2007331101 A | 12/2007 |
| JP | 2010538852 A | 12/2010 |
| JP | 2011519734 A | 7/2011 |
| JP | 5583015 B2 | 9/2014 |
| KR | 20100075838 A | 7/2010 |
| WO | 2009034425 A2 | 3/2009 |
| WO | WO-2009130721 A1 * | 10/2009 ........... B23Q 3/1546 |
| WO | WO-2009130722 A1 * | 10/2009 ........... B23Q 3/1543 |

OTHER PUBLICATIONS

International Search Report in the international application No. PCT/CN2018/097140, dated Nov. 2, 2018, 2 pgs.

English translation of the Written Opinion of the International Search Authority in the international application No. PCT/CN2018/097140, dated Nov. 2, 2018, 5 pgs.

* cited by examiner

ELECTRIC PERMANENT MAGNET CHUCK

TECHNICAL FIELD

The disclosure relates to the field of clamp, and in particular to an electric permanent magnetic chuck.

BACKGROUND

In recent years, an electric permanent magnetic chuck is used by more and more enterprises. Reversible magnetic material with a reversible polarity is disposed in the electric permanent magnetic chuck. A magnetic pole of the reversible magnetic material may be changed under the control of an external circuit, so as to switch to a working state or a non-working state. In the non-working state, an internal balance is achieved between a magnetic field generated by the reversible magnetic material and a magnetic field generated by permanent magnetic material in the electric permanent magnetic chuck, and thus there is no magnetic field acting on the exterior. In the working state, the magnetic field generated by the reversible magnetic material and the magnetic field generated by the permanent magnetic material are overlapped one another to jointly form magnetic field acting on the exterior, to absorb a material.

Figure 1:
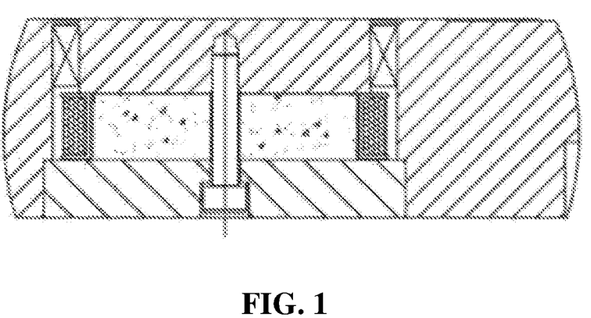
FIG. 1 is a structural schematic diagram of an electric permanent magnetic chuck in the conventional art.

In a conventional art, referring to FIG. 1, FIG. 1 is a structural schematic diagram of an electric permanent magnetic chuck in the conventional art.

The chuck includes a housing, a permanent magnetic material, a reversible magnetic material, a pressure plate, and a screw. In the conventional art, it is required to arrange a groove for placing the permanent magnetic material on a side close to an absorbed material in the housing. In order to ensure the magnetic field generated by the whole electric permanent magnetic chuck in the working state to the outside as high as possible, a distance from a bottom of the groove to an outer surface of the housing is required to be very small. As a result, a machining process is very difficult, and the occurrence of an inferior-quality product is frequent. Meanwhile, when the housing is machined subsequently, it is also required to form an inner cavity for placing the reversible magnetic material and the inner cavity for placing a cover plate by cutting. Generally, cross sections of the above-mentioned inner cavities are different in size, and the housing often further needs to be provided with a passage for placing a wire of an excitation coil, which results in that a difficulty in the machining process is very large, a structure of the housing is complex, and a corresponding machining manner is also complex.

SUMMARY

A technical problem to be solved by the disclosure is to overcome shortages and defects mentioned in the background and to provide an electric permanent magnetic chuck with a simple structure, a small machining difficulty, a good sealing property and a small magnetic loss.

In order to solve the above-mentioned technical problem, the disclosure provides the following technical solutions.

An electric permanent magnetic chuck includes a housing in which at least one opened inner cavity is provided. A reversible magnetic material is disposed on a lower portion of the inner cavity. A coil is disposed in the inner cavity and arranged along an outer wall of the reversible magnetic material. A magnetic pole is superimposed and fixed in the inner cavity. An annular groove is provided on a lower surface of the magnetic pole, and permanent magnetic material matching the annular groove is disposed in the annular groove.

A further improvement of the above-mentioned technical solution may be implemented as following examples.

In one example, the inner cavity does not penetrate through the lower portion of the housing, the coil is fixedly connected to an inner wall of the inner cavity, and the magnetic pole is disposed on the reversible magnetic material.

In one example, the magnetic pole is embedded into the inner cavity of the housing and fixedly connected to an inner wall of the housing, the coil is disposed on a bottom of the inner cavity. The permanent magnetic material is connected to the bottom of the annular groove at a junction by laser welding using a magnetic impermeable material.

In one example, the magnetic pole is embedded into an inner cavity of the housing and fixedly connected to an inner wall of the housing, the coil is disposed on a bottom of the inner cavity. The permanent magnetic material is connected to the bottom of the annular groove at a junction by using a material same as the magnetic pole.

In one example, the magnetic pole is disposed on the reversible magnetic material, the coil is fixedly connected to the inner wall of the inner cavity, the housing includes an outer shell and a bottom plate, the inner cavity penetrates through the outer shell, and the bottom plate is fixedly connected to a lower surface of the outer shell.

In one example, the inner cavity includes a first inner cavity and a second inner cavity, the reversible magnetic material and the coil are disposed in the first inner cavity, the magnetic pole is embedded into the second inner cavity, and an upward annular table for supporting the magnetic pole is disposed on an upper surface of the first inner cavity.

In one example, cross sections of the first inner cavity and the second inner cavity are of a circular shape, the reversible magnetic material is of a circular shape, and the annular groove on the magnetic pole and the permanent magnetic material are of a circular shape.

In one example, a sealing ring is disposed between the magnetic pole and the annular table.

In one example, the housing is provided with a first threaded hole penetrating through the housing in a vertical direction. The reversible magnetic material is provided with a threaded hole which penetrates through the reversible magnetic material in the vertical direction and cooperates with the first threaded hole of the housing. The magnetic pole is provided with a threaded hole cooperated with the threaded hole of the reversible magnetic material, to fixedly connect the housing, the reversible magnetic material and the magnetic pole to one another by a screw.

In one example, the bottom plate is provided with a first threaded hole and a second threaded hole which penetrate through the bottom plate in a vertical direction. The outer shell is provided with a threaded hole cooperated with the second threaded hole, to fixedly connect the outer shell with the bottom plate by a connecting bolt. The reversible magnetic material is provided with a threaded hole penetrating through the reversible magnetic material in the vertical direction and cooperated with the first threaded hole of the housing. The magnetic pole is provided with a threaded hole cooperated with the threaded hole of the reversible magnetic material, to fixedly connect the housing, the reversible magnetic material and the magnetic pole to one another by a screw.

In one example, the permanent magnetic material is connected to the bottom of the annular groove of the magnetic pole at a junction by a magnetic permeable material or by laser welding using the magnetic impermeable material.

In one example, the housing comprises multiple inner cavities uniformly distributed in the housing, and the multiple inner cavities are distributed in a checkerboard pattern.

In one example, polarities of the reversible magnetic material in any two adjacent inner cavities are different on a same side, and the polarities of the permanent magnetic material in any two corresponding adjacent inner cavities are different on a same side.

In one example, a wiring hole is provided in the housing, and a metal plug is disposed at the wiring hole.

In one example, a wire passing hole in communication with the multiple inner cavities is provided in the housing.

In one example, the magnetic pole is disposed on the reversible magnetic material, the housing includes an outer shell and a bottom plate, the inner cavity penetrates through the outer shell, the bottom plate is fixedly connected to a lower surface of the outer shell, the magnetic pole is of a barrel-shape, the annular groove is provided on a bottom surface of the barrel-shaped magnetic pole, and a barrel wall of the magnetic pole arranged around the reversible magnetic material and the coil.

In one example, a border of a barrel edge of the magnetic pole is folded outwards.

Compared with the conventional art, the disclosure has the following beneficial effects.

According to an electric permanent magnetic chuck provided by the disclosure, a housing is separated from a magnetic pole portion provided with a permanent magnet, an inner cavity opened from an end surface is provided on the housing, and the magnetic pole portion is detachably mounted in the inner cavity of the housing, so that a traditional housing and magnetic pole integrated machining manner is replaced, the complexity of an internal structure of the housing is greatly reduced, the machining difficulty is lowered, the machining precision is improved, the rejection rate is lowered, and lots of manpower, materials and resources are saved; and meanwhile, an air gap of the housing of the electric permanent magnetic chuck provided by the disclosure is small, so that the magnetic loss is not generated easily, and the clamping effect is more excellent.

BRIEF DESCRIPTION OF THE DRAWINGS

In order to describe the technical solutions in the embodiments of the disclosure or in the conventional art more clearly, a simple introduction on the accompanying drawings which are needed in the description of the embodiments or conventional art is given below. Apparently, the accompanying drawings in the description below are merely some of the embodiments of the disclosure, based on which other drawings may be obtained by those of ordinary skill in the art without any creative effort.

List of reference symbols: 1. housing, 11. outer shell, 111. first threaded hole, 112. second threaded hole, 12. bottom plate, 13. wiring hole, 14. metal plug, 15. wire passing hole, 2. reversible magnetic material, 3. coil, 4. magnetic pole, and 5. permanent magnetic material.

DETAILED DESCRIPTION

In order to facilitate understanding of the disclosure, a more complete and detailed description is made to the disclosure below in combination with the accompanying drawings and preferred embodiments of the specification. However, a protection scope of the disclosure is not limited to the following specific embodiments.

Embodiment 1

Figure 2:
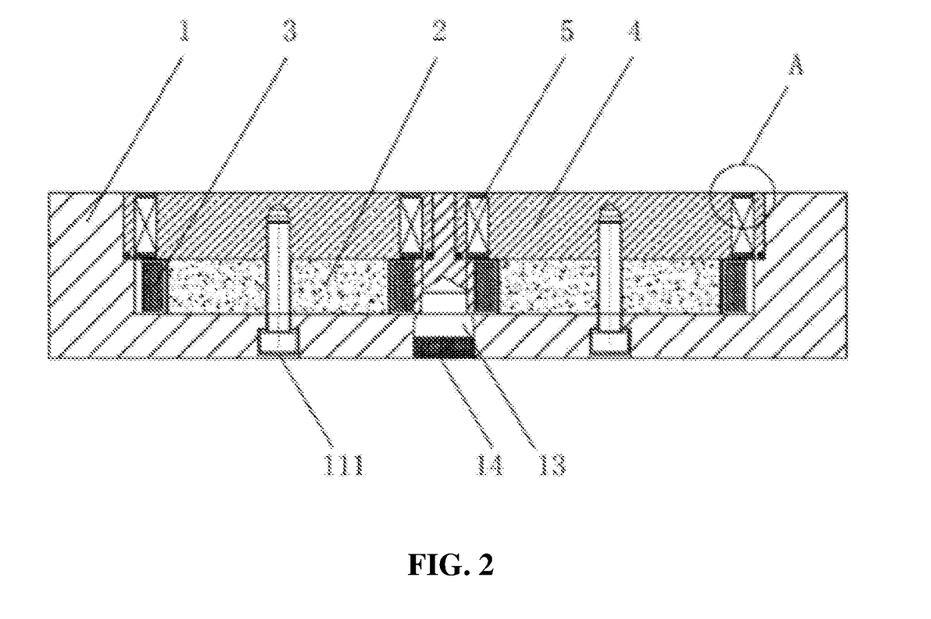
FIG. 2 is a structural schematic diagram of an electric permanent magnetic chuck in Embodiment 1.
Figure 3:
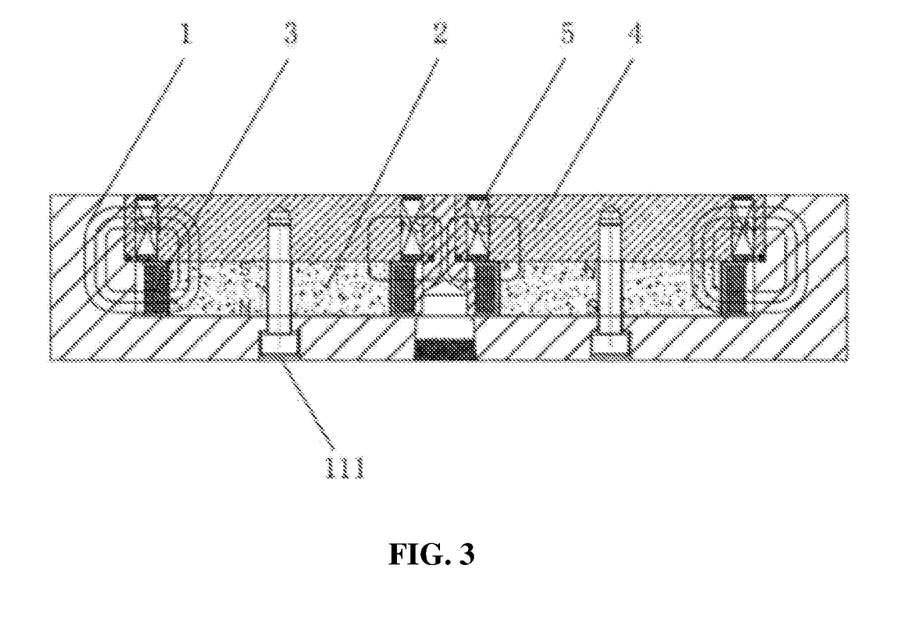
FIG. 3 is a magnetic circuit diagram when an electric permanent magnetic chuck in Embodiment 1 exhibits to be non-magnetic to the outside.
Figure 4:
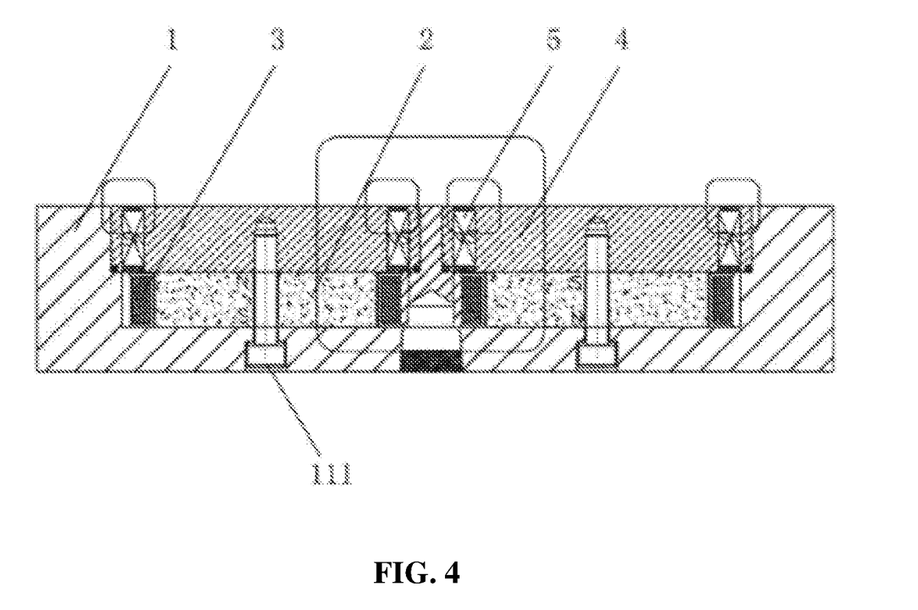
FIG. 4 is a magnetic circuit diagram when an electric permanent magnetic chuck in Embodiment 1 exhibits to be absorbed to the outside.

As shown in FIG. 2 to FIG. 4, an electric permanent magnetic chuck in this embodiment includes a housing 1. The housing 1 includes an inner cavity which does not penetrate through a lower portion of the housing 1. Reversible magnetic material 2 is disposed on a lower portion of the inner cavity. A coil 3 is disposed along an outer wall of the reversible magnetic material 2. The coil 3 is fixedly connected to an inner wall of the inner cavity. A skeleton for supporting the coil 3 is further disposed out of the coil 3, so that it is assured that the coil has a stable structure. A magnetic pole 4 fixedly connected to the inner wall of the inner cavity is disposed on the reversible magnetic material 2. An annular groove is provided on a lower surface of the magnetic pole 4. Permanent magnetic material 5 matching the annular groove is disposed in the annular groove. According to the electric permanent magnetic chuck in this embodiment, a housing 1 is separated from a magnetic pole 4 portion provided with permanent magnetic material 5, and only an inner cavity opened at one end surface and not penetrating through the other end surface needs to be provided on the housing 1. Since a problem for placing the annular permanent magnetic material 5 does not need to be considered, a structure of the housing 1 is greatly simplified, and the housing 1 is machined more easily. The magnetic pole 4 only needs to be provided with an annular groove for placing the permanent magnetic material 5, so the structure is also very simple. Such a structure replaces a traditional magnetic pole 4 and housing 1 integrated machining manner, so that the machining difficulty is greatly reduced, the machining precision is improved, the rejection rate is lowered, and lots of manpower, materials and resources are saved; and without an air gap for disposing a cover plate, the air gap on the housing 1 of the electric permanent magnetic chuck is smaller, the magnetic loss is not produced easily and the clamping effect is more excellent.

Figure 6:
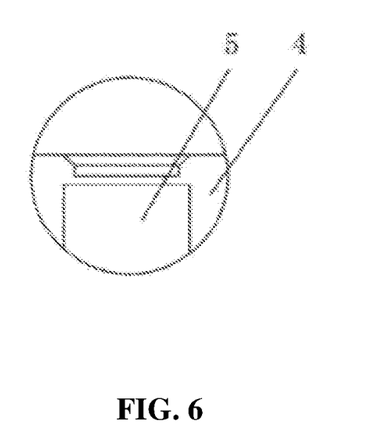
FIG. 6 is an enlarged diagram of an A place in HG. 1.

As shown in FIG. 6, in order to guarantee that a magnetic field to the outside is as strong as possible, a junction between the permanent magnetic material 5 and a bottom of the annular groove is required to be as thin as possible. In this embodiment, the permanent magnetic material 5 is connected to the bottom of the annular groove at the junction by using a material same as the magnetic pole 4. Compared with a previous manner where a copper material serves as the bottom of the annular groove, a magnetic permeable layer having the material same as the magnetic pole 4 is machined integrally in machining, thus being more convenient. Moreover, a stress in case of an external force and a temperature change is closer to the magnetic pole 4, so that a condition such as cracking and water ingress caused by misposition is prevented, and a sealing property is better.

Figure 5:
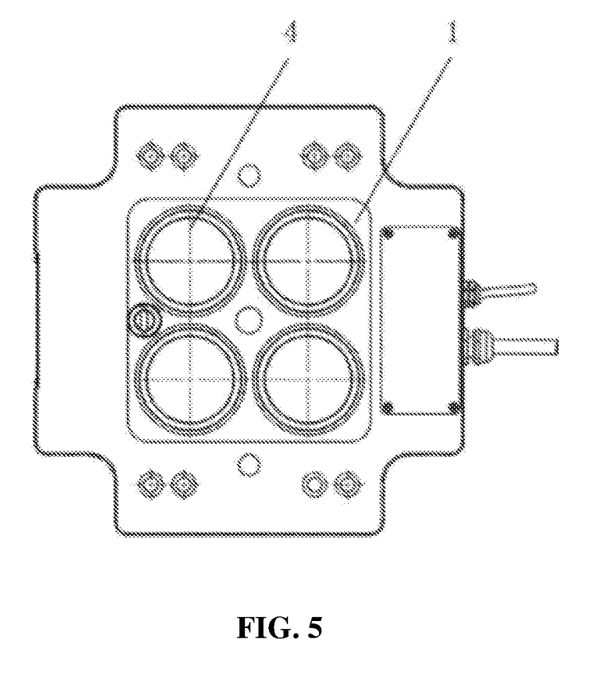
FIG. 5 is a top structural schematic diagram of an electric permanent magnetic chuck in Embodiment 1.

In this embodiment, as shown in FIG. 5, in order to machine conveniently and in order that a generated magnetic field is a uniform magnetic field, the permanent magnetic material 5 is of a circular structure, and the corresponding annular groove is a circular groove. In other embodiments, the permanent magnetic material 5 and the annular groove may also be of other shapes, which is not defined herein.

In this embodiment, a place between the permanent magnetic material 5 and a lower surface of the magnetic pole 4, namely, an opening place of the annular groove, is sealed by an epoxy resin. Herein, the epoxy resin does not contact with an external working environment, so that the sealing failure caused by aging is not accelerated. In other embodiments, this place may also be sealed in other manners or not sealed, which is not defined specifically herein.

In this embodiment, a cross section of the inner cavity is of a circular shape, the inner cavity includes a first inner cavity and a second inner cavity, the cross section of the second inner cavity is greater than that of the first inner cavity, the first inner cavity is provided with the reversible magnetic material 2, the coil 3 is disposed along the outer wall of the reversible magnetic material 2, and the coil 3 is fixedly connected to an inner wall of the first inner cavity. The second inner cavity is provided with the magnetic pole 4 fixedly connected to an inner wall of the second inner cavity. An upward annular table for supporting the magnetic pole 4 is disposed on an upper surface of the first inner cavity, to limit an axial movement of the magnetic pole, and stabilize a fixing position of the magnetic pole 4, so that the sealing property between the magnetic pole 4 and the housing 1 is further improved. A sealing ring is provided between the magnetic pole 4 and the annular table, and a groove having a shape corresponding to the sealing ring is provided on the magnetic pole 4 and the annular table, so that the overall sealing property of the electric permanent magnetic chuck is enhanced. In addition, the sealing ring may further be placed on an axial direction and a radial direction.

In this embodiment, the housing 1 includes multiple inner cavities, the multiple inner cavities are distributed in a chessboard manner, polarities of the reversible magnetic material 2 in any two adjacent inner cavities on a same side are different, and the polarities of the permanent magnetic material 5 in any two corresponding adjacent inner cavities on the same side are different. When a workpiece is not absorbed, the electric permanent magnetic chuck exhibits to be non-magnetic to the outside, and a magnetic circuit at this time is as shown in FIG. 3. When the workpiece is absorbed, the electric permanent magnetic chuck exhibits to be magnetic to the outside, and the magnetic circuit at this time is as shown in FIG. 4. Four adjacent inner cavities are around each inner cavity in this embodiment. In other embodiments, the number of adjacent inner cavities around each inner cavity may be different, which is not defined specifically herein.

In this embodiment, a wiring hole 13 is provided in the housing 1, a metal plug 14 is disposed at an opening place of the wiring hole 13, and a lead wire for communicating with an external power supply and the coil 3 passes through the wiring hole 13, and configured to supply power to the coil 3. By virtue of the wiring hole 13, the coil 3 in each accommodation hole can communicate, so that a purpose of controlling the coil 3 in each accommodation hole by one electrical signal is achieved. The metal plug 14 is disposed at the opening place of the wiring hole 13, so that a cavity generated by the wiring hole 13 in the housing 1 is prevented from affecting the permeability.

In this embodiment, the housing 1 is provided with a first threaded hole 111 penetrating through the housing 1 in a vertical direction; the reversible magnetic material 2 is provided with a threaded hole penetrating through the reversible magnetic material 2 in the vertical direction and cooperated with the first threaded hole 111 of the housing 1; and the magnetic pole 4 is provided with a threaded hole cooperated with the threaded hole of the reversible magnetic material 2, to fixedly connect the housing 1, the reversible magnetic material 2 and the magnetic pole 4 to one another by a screw. By virtue of screwed connection, the whole electric permanent magnetic chuck is firmer, and a component is not fallen off easily.

In this embodiment, the housing 1 is generally made of Q245 material or 45#material. Such type of material is a soft magnetic material with good permeability, and excellent wear resistance and corrosion resistance. The magnetic pole 4 is often made of a material same as the housing 1. The reversible magnetic material 2 is often aluminum-nickel-cobalt magnetic material, and the polarity may change by an external circuit. The coil 3 is connected to the inner wall of the inner cavity in a glue filling manner. The permanent magnetic material 5 often uses rubidium-iron-boron magnetic material, and configured to generate a stable unchanged magnetic field. The above materials and connection manners may change in other embodiments, and are not defined specifically herein.

Embodiment 2

Figure 7:
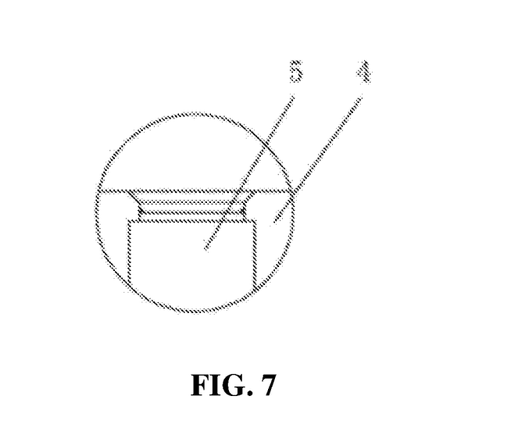
FIG. 7 is an enlarged diagram of a bottom of an annular groove of a permanent magnetic unit in Embodiment 2.

This embodiment is basically the same as the embodiment 1 and a difference lies in: as shown in FIG. 7, in this embodiment, permanent magnetic material 5 is connected to a bottom of an annular groove at the junction by laser welding using a magnetic impermeable material. An insulation layer does not cause a magnetic loss, and a laser welding manner may take a good sealing effect. The magnetic impermeable material uses stainless material. In other embodiments, other materials may also be used, which is not defined specifically herein.

Embodiment 3

Figure 8:
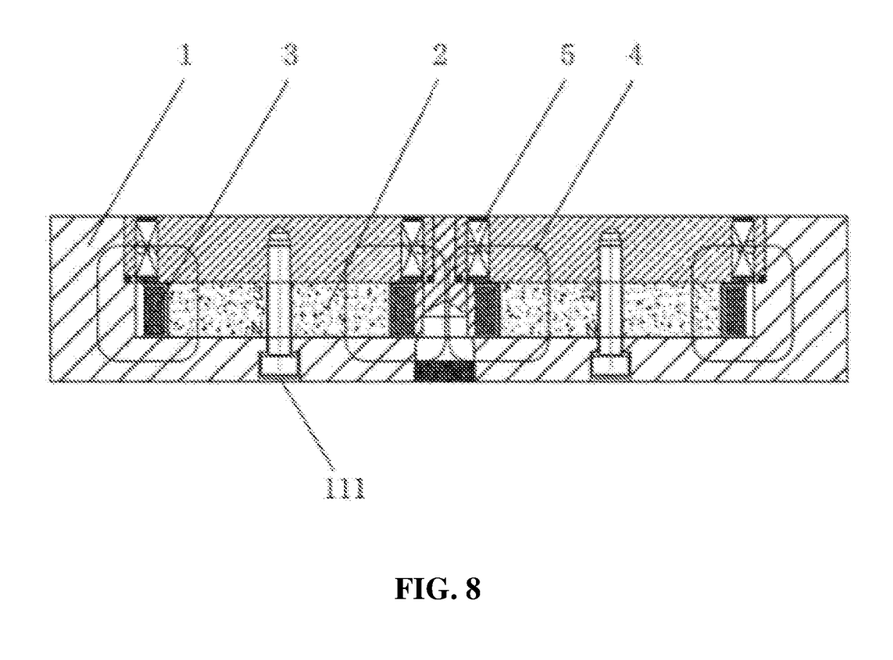
FIG. 8 is a magnetic circuit diagram when an electric permanent magnetic chuck in Embodiment 3 exhibits to be non-magnetic to the outside.
Figure 9:
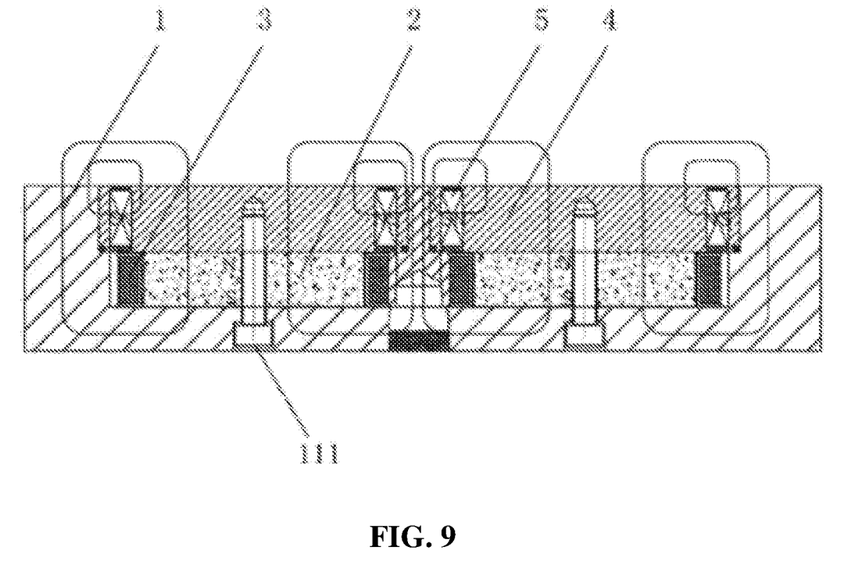
FIG. 9 is a magnetic circuit diagram when an electric permanent magnetic chuck in Embodiment 3 exhibits to be absorbed to the outside.

This embodiment is basically the same as the embodiment 1 and the embodiment 2, and the difference lies in: as shown in FIG. 8 and FIG. 9, when the permanent magnetic material 5 in two adjacent accommodation holes is arranged on a same direction, the coils 3 in the two accommodation holes after being powered on are on the same direction with the reversible magnetic material 2. When a workpiece is not absorbed, the electric permanent magnetic chuck exhibits to be non-magnetic to the outside, and a magnetic circuit at this time is as shown in FIG. 8. When the workpiece is absorbed, the electric permanent magnetic chuck exhibits to be magnetic to the outside, and the magnetic circuit at this time is as shown in FIG. 9.

Embodiment 4

Figure 10:
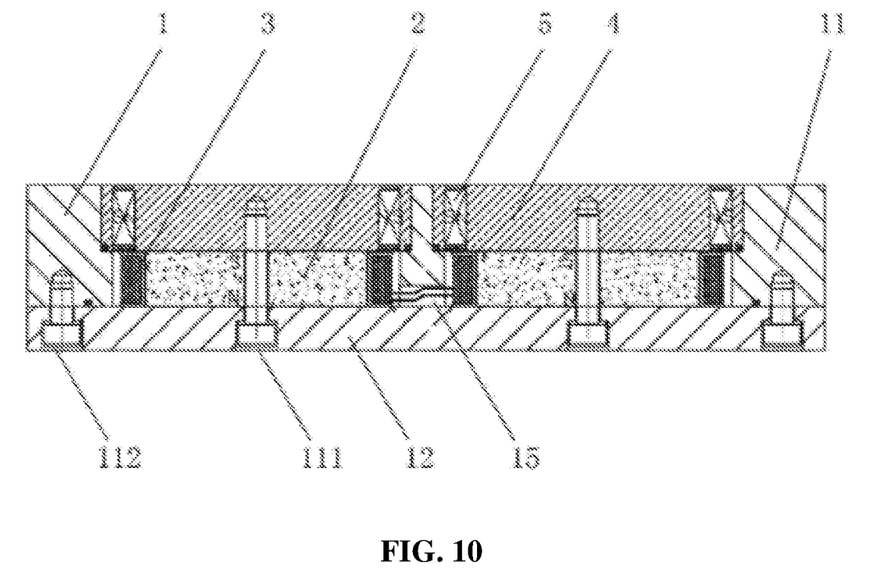
FIG. 10 is a structural schematic diagram of an electric permanent magnetic chuck in Embodiment 4.

This embodiment is basically the same as the embodiment 1, the embodiment 2 and the embodiment 3, and the difference lies in: as shown in FIG. 10, in this embodiment, the housing 1 includes an outer shell 11 and a bottom plate 12; the inner cavity penetrates through the outer shell 11; and the bottom plate 12 is fixedly connected to a lower surface of the outer shell 11. That is, the housing 1 is further split, and only drilling a through hole on the outer shell 11 may form the inner cavity, so that the machining process is simple, the structure of the housing 1 is more simplified, the machining difficulty is further lowered, and the manpower, materials and time are saved better.

In this embodiment, the bottom plate 12 is provided with a second threaded hole 112 and a first threaded hole 111 penetrating through the bottom plate 12 in a vertical direction; and the housing 11 is provided with a threaded hole cooperated with the second threaded hole 112, to fixedly connect the outer shell 11 with the bottom plate 12 by a connecting bolt.

Embodiment 5

Figure 11:
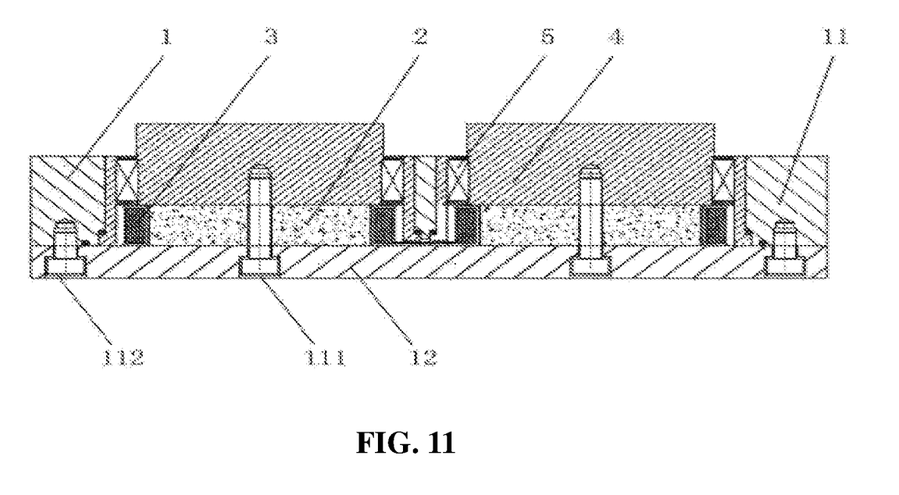
FIG. 11 is a structural schematic diagram of an electric permanent magnetic chuck in Embodiment 5.
Figure 12:
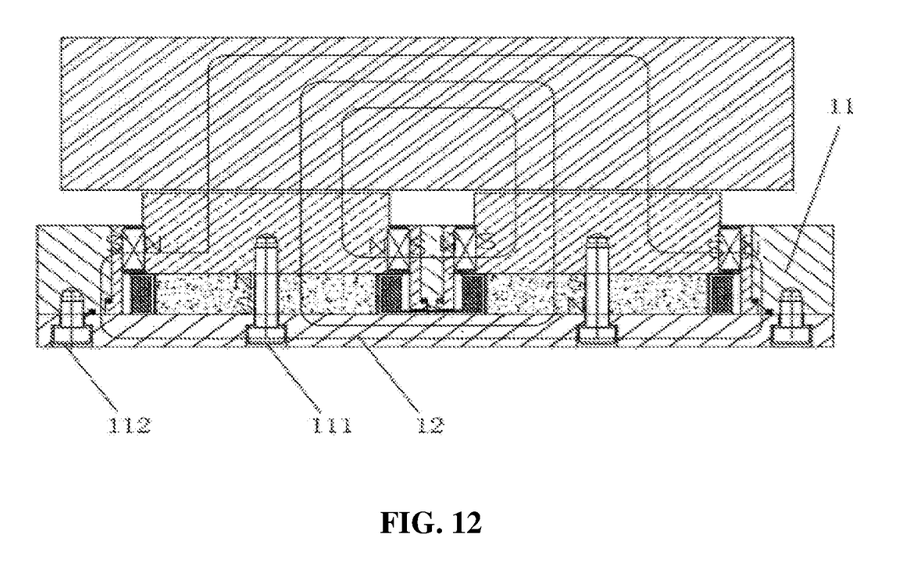
FIG. 12 is a magnetic circuit diagram when an electric permanent magnetic chuck absorbs a workpiece in Embodiment 5.

This embodiment is basically the same as the embodiment 4, and the difference lies in: as shown in FIG. 11 and FIG. 12, in this embodiment, the magnetic pole 4 is of a barrel-shape, the annular groove is provided on a bottom surface of the barrel-shaped magnetic pole 4, and a barrel wall of the magnetic pole 4 is arranged around the reversible magnetic material 2 and the coil 3, so that the contact of the reversible magnetic material 2 with the coil 3 and the magnetic pole 4 is closer. A border of a barrel edge of the magnetic pole 4 is folded outwards, so the clamping with the outer shell can be better. A wire passing hole 15 in communication with the multiple inner cavities is provided in the housing 1, which results in that the coil 3 in each accommodation hole can communicate, and a purpose of controlling the coil 3 in each accommodation hole by one electrical signal is achieved.

The above are merely preferred embodiments of the disclosure. The protection scope of the disclosure is not only limited to the above embodiments. Improvements and alterations obtained by those skilled in the art without departing from a technical concept of the disclosure should also be considered as the protection scope of the disclosure.

The invention claimed is:

1. An electric permanent magnetic chuck, comprising a housing, wherein the housing is provided with at least one opened inner cavity, a reversible magnetic material is disposed on a lower portion of the inner cavity, a coil is disposed in the inner cavity and arranged along art outer wall of the reversible magnetic material, a magnetic pole is detachably mounted in the inner cavity of the housing, an annular groove is provided on a lower surface of the magnetic pole, and a permanent magnetic material matching the annular groove is disposed in the annular groove, the magnetic pole is embedded into the inner cavity of the housing and fixedly connected to an inner wall of the housing, the coil is disposed on a bottom of the inner cavity, and the permanent magnetic material is connected to a bottom of the annular groove at a junction by laser welding using a magnetic impermeable material, or the permanent magnetic material is connected to the bottom of the annular groove at the junction by using a same material as the magnetic pole.

2. The electric permanent magnetic chuck according to claim 1, wherein the inner cavity does not penetrate through a lower portion of the housing, the coil is fixedly connected to an inner wall of the inner cavity, and the magnetic pole is disposed on the reversible magnetic material.

3. The electric permanent magnetic chuck according to claim 2, wherein the inner cavity comprises a first inner cavity and a second inner cavity, the reversible magnetic mater d the coil are disposed in the first inner cavity, the magnetic pole is embedded into the second inner cavity, and an upward annular table for supporting the magnetic pole is disposed on an upper surface of the first inner cavity, and cross sections of the first inner cavity and the second inner cavity are of a circular shape, the reversible magnetic material is of a circular shape, and the annular groove on the magnetic pole and the permanent magnetic material are of a circular shape.

4. The electric permanent magnetic chuck according to claim 2, wherein the housing is provided with a first threaded hole penetrating through the housing in a vertical direction, the reversible magnetic material is provided with a threaded hole which penetrates through the reversible magnetic material in the vertical direction and cooperates with the first threaded hole of the housing, the magnetic pole is provided with a threaded hole cooperating with the threaded hole of the reversible magnetic material, to fixedly connect the housing, the reversible magnetic material and the magnetic pole to one another by a screw.

5. The electric permanent magnetic chuck according to claim 1, wherein the magnetic pole is disposed on the reversible magnetic material, the coil is fixedly connected to an inner wall of the inner cavity, the housing comprises an outer shell and a bottom plate, the inner cavity penetrates through the outer shell, and the bottom plate is fixedly connected to a lower surface of the outer shell.

6. The electric permanent magnetic chuck according to claim 5, wherein the inner cavity comprises a first inner cavity and a second inner cavity, the reversible magnetic material and the coil are disposed in the first inner cavity, the magnetic pole is embedded into the second inner cavity, and an upward annular table for supporting the magnetic pole is disposed on an upper surface of the first inner cavity, and cross sections of the first inner cavity and the second inner cavity are of a circular shape, the reversible magnetic material is of a circular shape, and the annular groove on the magnetic pole and the permanent magnetic material are of a circular shape.

7. The electric permanent magnetic chuck according to claim 5, wherein the bottom plate is provided with a first threaded hole and a second threaded hole which penetrate through the bottom plate in a vertical direction, the outer shell is provided with a threaded hole cooperating with the second threaded hole, to fixedly connect the outer shell with the bottom plate by a connecting bolt, the reversible magnetic material is provided with a threaded hole penetrating through the reversible magnetic material in the vertical direction and cooperates with the first threaded hole of the housing, the magnetic pole is provided with a threaded hole cooperating with the threaded hole of the reversible magnetic material, to fixedly connect the housing, the reversible magnetic material and the magnetic pole to one another by a screw.

8. The electric permanent magnetic chuck according to claim 1, wherein the inner cavity comprises a first inner cavity and a second inner cavity, the reversible magnetic material and the coil are disposed in the first inner cavity, the magnetic pole is embedded into the second inner cavity, and an upward annular table for supporting the magnetic pole is disposed on art upper surface of the first inner cavity.

9. The electric permanent magnetic chuck according to claim 1, wherein the inner cavity comprises a first inner cavity and a second inner cavity, the reversible magnetic material and the coil are disposed in the first inner cavity, the magnetic pole is embedded into the second inner cavity, and an upward annular table for supporting the magnetic pole is disposed on an upper surface of the first inner cavity, and cross sections of the first inner cavity and the second inner cavity are of a circular shape, the reversible magnetic material is of a circular shape, and the annular groove on the magnetic pole and the permanent magnetic material are of a circular shape.

10. The electric permanent magnetic chuck according to claim 1, wherein the housing is provided with a first threaded hole penetrating through the housing in a vertical direction, the reversible magnetic material is provided with a threaded hole which penetrates through the reversible magnetic material in the vertical direction and cooperates with the first threaded hole of the housing, the magnetic pole is provided with a threaded hole cooperating with the threaded hole of the reversible magnetic material, to fixedly connect the housing, the reversible magnetic material and the magnetic pole to one another by a screw.

11. The electric permanent magnetic chuck according to claim 1, wherein the housing comprises multiple inner cavities uniformly distributed in the housing.

12. The electric permanent magnetic chuck according to claim 11, wherein the multiple inner cavities are distributed in a checkerboard pattern.

13. The electric permanent magnetic chuck according to claim 11, wherein polarities of the reversible magnetic material in any two adjacent inner cavities are different on a same side, and polarities of the permanent magnetic material in any two corresponding adjacent inner cavities are different on a same side, and a wire passing hole in communication with the multiple inner cavities is provided in the housing.

14. The electric permanent magnetic chuck according to claim 1, wherein the magnetic pole is disposed on the reversible magnetic material, the housing comprises an outer shell and a bottom plate, the inner cavity penetrates through the outer shell, the bottom plate is fixedly connected to a lower surface of the outer shell, the magnetic pole is of a barrel-shape, the annular groove is provided on a bottom surface of the barrel-shaped magnetic pole, and a barrel wall of the magnetic pole is arranged around the reversible magnetic material and the coil.

15. The electric permanent magnetic chuck according to claim 14, wherein a border of a barrel edge of the magnetic pole is folded outwards.

\* \* \* \* \*